(12) United States Patent
Gross et al.

(10) Patent No.: US 6,857,379 B2
(45) Date of Patent: Feb. 22, 2005

(54) METHOD AND DEVICE FOR INCINERATING ORGANIC WASTE MATERIAL

(75) Inventors: Gerhard Gross, Willich (DE); Paul Ludwig, Kelkheim (DE); Diana Wassmann, Krefeld (DE); Hans-Peter Theis, Florsheim (DE)

(73) Assignee: Messer Griesheim GmbH (DE)

( * ) Notice: Subject to any disclaimer, the term of this patent is extended or adjusted under 35 U.S.C. 154(b) by 0 days.

(21) Appl. No.: 10/275,181

(22) PCT Filed: May 2, 2001

(86) PCT No.: PCT/EP01/04901

§ 371 (c)(1),
(2), (4) Date: Jun. 16, 2003

(87) PCT Pub. No.: WO01/84051

PCT Pub. Date: Nov. 8, 2001

(65) Prior Publication Data

US 2004/0103832 A1 Jun. 3, 2004

(30) Foreign Application Priority Data

May 3, 2000 (DE) .......................... 100 21 448

(51) Int. Cl.⁷ ............................. F23G 5/30; F23N 5/00
(52) U.S. Cl. ....................... 110/346; 110/345; 110/243; 110/186; 110/188
(58) Field of Search ................................. 110/243, 244, 110/245, 345, 346, 185, 186, 188; 208/163, 409; 422/139, 146

(56) References Cited

U.S. PATENT DOCUMENTS

| 4,441,435 A | | 4/1984 | Miyamoto | |
|---|---|---|---|---|
| 4,824,360 A | * | 4/1989 | Janka et al. | 431/7 |
| 5,020,451 A | * | 6/1991 | Maebo et al. | 110/189 |
| 5,138,958 A | * | 8/1992 | Sinquin et al. | 110/346 |
| 5,335,609 A | * | 8/1994 | Nelson et al. | 110/346 |
| 5,709,041 A | * | 1/1998 | Tarplee | 34/595 |
| 6,418,866 B1 | * | 7/2002 | Shimizu et al. | 110/347 |
| 6,505,567 B1 | * | 1/2003 | Anderson et al. | 110/344 |

FOREIGN PATENT DOCUMENTS

| DE | 197 14 073 | 10/1998 |
|---|---|---|
| GB | 2 285 119 | 6/1995 |

OTHER PUBLICATIONS

International Search Report (and translation of German language DE 197 14 073).

* cited by examiner

Primary Examiner—Kenneth Rinehart

(57) ABSTRACT

According to a conventional method for incinerating organic waste material, a fluidization device causes an oxygenous fluidizing gas to flow through the waste material, which is located in an incineration chamber, from underneath while forming a fluidized particle layer and the waste material is incinerated. The resulting flue gas is withdrawn via an open space situated above the particle layer and is subjected to a secondary incineration in a secondary reaction zone or secondary incineration chamber. Expanding upon the prior art, the aim of the invention is enable a high throughput for the incineration material while resulting in a low level of nitrogen oxide production, and to increase the productivity for the incineration of organic waste material. To these ends, the invention provides that the fluidized particle layer (3) is concentrated with oxygen in such a manner that a mean oxygen content ranging from 0–3 vol. % is set in the open space (6).

18 Claims, 3 Drawing Sheets

METHOD AND DEVICE FOR INCINERATING ORGANIC WASTE MATERIAL

Figure 1:
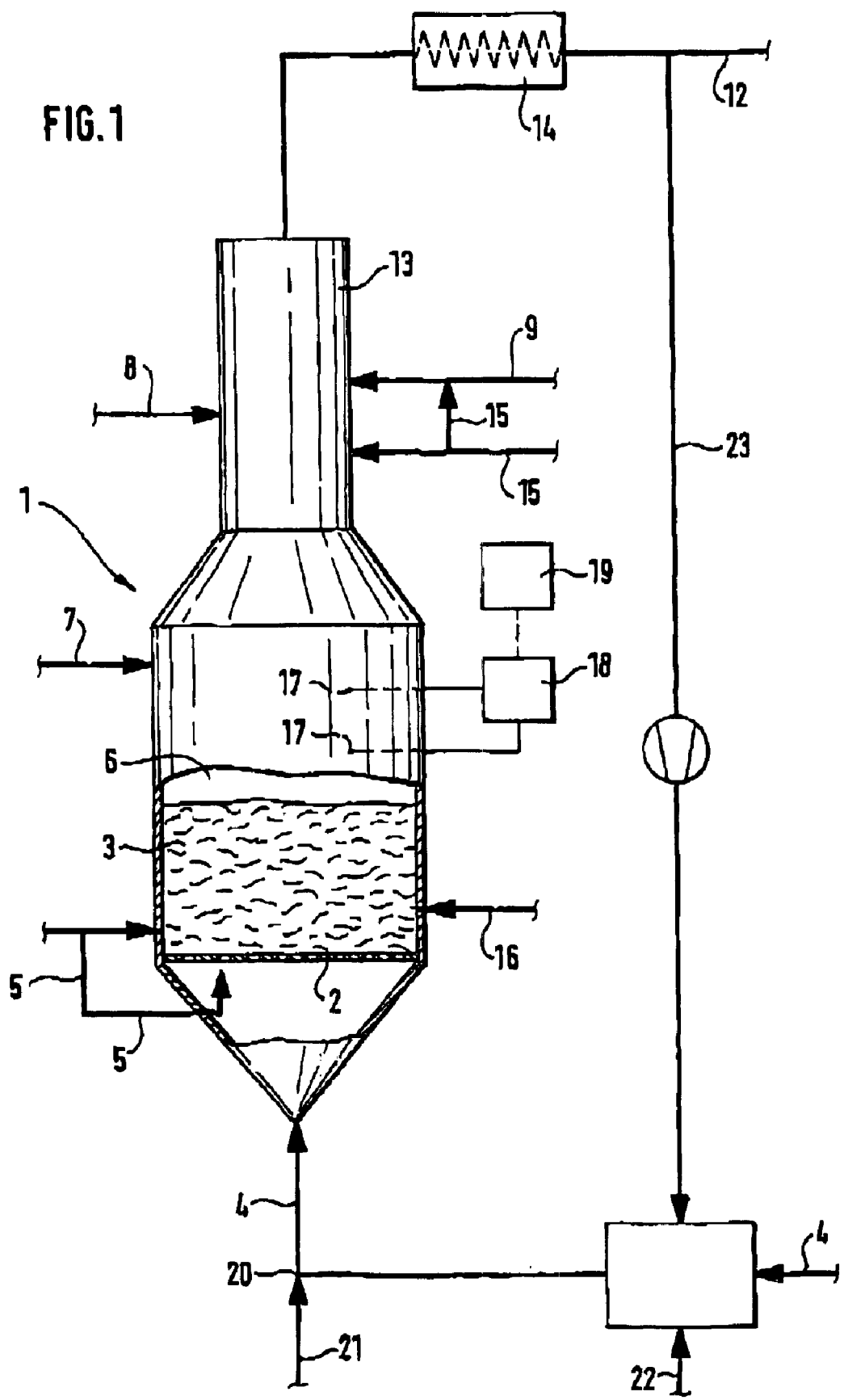

The present invention relates to a process for the incineration of organic waste, in which a fluidization device causes an oxygen containing fluidization gas to flow from underneath through waste material located in an incineration chamber, whereby a fluidized particle layer is formed and the waste material is incinerated, and flue gas generated is withdrawn by way of an open space above the particle layer and subjected to a secondary combustion in a post-incineration reaction zone or post-incineration reaction chamber.

The invention further relates to an apparatus for operating the process, including an incineration chamber for receiving the organic waste material, a feeder device for feeding the organic waste material to the incineration chamber, a gas inlet with a fluidization device for the feeding of a fluidization gas for generation of a fluidized particle layer, and a measurement device for the measurement of a gas concentration in a open space above the particle layer.

Incineration reactions of combustible materials in stationary or circulating fluidized be reactors with air as fluidization gas are known and part of the prior art. Especially organic waste materials are incinerated in stationary fluidized bed reactors in order to avoid that uncombusted fine dust is carried from the fluidized bed which is separated as uncombusted organic carbon in the filter ash.

The organic waste material is, for example, sewage sludge, waste water, liquors, granulated plastics waste, black liquor from paper production, deinking sludge, etc.

Fluidized particle layers or fluidized beds are produced in that a fluidization gas is guided from below through a layer or bed of fine grained or flowable solid particles by way of a suitable fluidization device—for example, an inflow floor or nozzles. Above a characteristic fluidization speed, the loosening speed, which is dependent on the size, shape and density of the solid particles, the particles start to float, and the particle layer is fluidized. The height of the fluidized bed is increased by increasing the fluidization speed, whereby the fluidization speed is proportional to the flow volume of the fluidization gas.

Beyond a characteristic limiting speed, the so called blow out speed, fine grained bed material is carried off out of the fluidized bed. This speed range between the loosening speed and the blow out speed characterizes the range of the stationary fluidized bed. At higher fluidization speeds, larger particles are carried off apart from the fine dust, so that a defined fluidized bed is no longer present. This is the range of the circulating fluidized bed.

Air is usually used as fluidization gas for incineration reactions in fluidized particle layers and the material to be incinerated is placed from above onto the fluidized bed. The solid particles consisting of the bed material and the material to be incinerated are thereby maintained in suspension and the combustible materials are oxidized at the same time. The bed material normally consists of inert, fine grained materials, such as $SiO_2$ or $Al_2O_3$.

Depending on the caloric value and water content of the organic waste material, fuel must be added to the fluidized particle layer in order to maintain the incineration temperature in the fluidized bed which is technically sensible or required by law. Suitable fuels are combustible gases, heating oil, or coal, which are added to the fluidized bed by way of suitable injectors built into the wall or the inflow floor. When coal is used, it is normally admixed with the organic waste material prior to entry into the furnace.

A process and apparatus of the above mentioned type are known from WO97/44620. A process for the operation of a fluidized bed furnace for the incineration of sewage sludge, garbage, or coal is described, whereby the material to be incinerated is fed into a incineration zone in the furnace, a fluidized bed is formed by flowing air therethrough by way of an inflow floor, and the material is incinerated. The flue gases are withdrawn in the open space above the fluidized bed and subjected to a secondary incineration. Poisonous nitrous oxides ($NO_x$) are formed during the combustion of organic waste, the concentration of which is to be kept as low as possible and cannot exceed a certain upper limit prescribed by law. In order to lower the $NO_x$ content of the flue gases, it is suggested in the WO97/44620 to generate a turbulent movement in the open space by injecting an inert gas or a water vapor flow. The $NO_x$ formed during combustion is reduced in the open space to molecular nitrogen by the presence of reducing substances such as CO or $NH_3$. The $NO_x$ content is captured by way of a measurement device provided in the open space and recorded.

In a post-incineration combustion zone or secondary incineration chamber directly adjacent to the open space, the uncombusted, gaseous and solid combustible components of the flue gas are subjected to a secondary incineration by the addition of air and additional fuel and the resulting flue gas is heated to the prescribed temperature and adjusted to the oxygen concentration required by law, for example 6% per volume.

The throughput of organic waste is limited by the available cross-section of the inflow floor in such stationary fluidized bed reactors. Furthermore, the maximum capacity of the suction blower is often limited, since its capacity is adapted to the maximum flue gas flow volume which is proportional to the organic waste material.

The amount of fluidization gas can thereby be varied only within a very narrow range for certain preset fluidized bed cross-sections, so that for small amounts of waste material more air must be added into the furnace for the fluidization than is needed for incineration. In order to maintain the fluidized bed temperature constant, the specific additional fuel amount must be increased, which means the incineration efficiency is reduced. However, for organic fuels with bound elementary nitrogen, such as protein compounds, etc., higher oxygen contents in the fluidized bed than stoichiometrically necessary cause higher nitrous oxide formation rates. To keep within the legal limits, costly processes for the $NO_x$ removal from the flue gas are then necessary.

It is therefore an object of the present invention to provide a process which at a reduced level of nitrous oxide formation provides a high throughput for the material to be incinerated, which means increases the productivity for the incineration of organic waste, and to provide an apparatus suitable therefor.

With respect to the process, this object is achieved, starting with the process described above, in that the fluidized particle layer is enriched with oxygen, whereby an average oxygen content in the range of 0 to 3% per volume is adjusted in the open space, and a secondary incineration is carried out in a post-incineration reaction zone or post-incineration chamber.

It has been found that the $NO_x$ concentration can be lowered despite the enrichment of the fluidized bed with oxygen. This is initially surprising, since an increase in the $NO_x$ should rather be expected upon addition of an oxidizing agent as strong as oxygen. This is true especially in view of the conventional, above mentioned SCR and SNCR processes, wherein even an additional reducing agent is used for the reduction of the $NO_x$ concentration.

The incineration of the organic waste is accelerated and the gaseous (CO) and solid (organic carbon) burning-out improved by the addition of oxygen into the particle layer. Furthermore, a reduction of the $CO_2$ emission is achieved, in that less additional fuel is burnt for maintaining the temperature in the fluidized bed.

However, these effects are achieved only under the condition that an atmosphere is adjusted in the open space which is reducing or at most little oxidizing. A reference point herefor is a mean oxygen content in the range of 0 to 3% per volume in the open space. The term 'mean' oxygen content means that the oxygen content is measured in at least one region within the open space in which neither an extremely high nor an extremely low oxygen content is expected. However, for reasons of measurement accuracy, the 'mean' oxygen content is preferably determined as a mean of at least two measurements of the oxygen content in the open space. These measurements can be carried out separated in time and/or space at spaced apart locations in the open space.

The fluidized particle layer is enriched with oxygen. Either pure oxygen, or a gas mixture with an oxygen content of 80% by volume is used for the enrichment of the fluidized particle layer. Oxygen is thereby directly injected into the particle layer or indirectly—for example by injection into the fluidization gas. It is also possible to inject an oxygen containing gas flow into the particle layer in addition to the fluidization gas and by way of the fluidization device.

However, one process variant has proven especially advantageous wherein oxygen is added to the fluidization gas in a first feeder zone, in flow direction before the fluidization device. The oxygen is thereby warmed to the temperature of the fluidization gas prior to injection into the particle layer, so that the formation of a temperature gradient in the particle layer is maintained as minimal as possible. An even temperature distribution in the fluidized bed is desirable in order to guarantee a sufficient burning-out.

In this process variant, the oxygen content of the fluidization gas after the first injection zone is preferably adjusted to an oxygen threshold value of 10 to 28% by volume. In a first approximation, the throughput of the organic waste to be incinerated increases with the oxygen content. A further parameter which influences the throughput of the organic waste to be incinerated is the temperature of the fluidization gas. Not preheated ambient air as well as warmed up ambient air or air heated to high temperatures can be used as fluidization gas. In a process with warmed up or preheated air, the temperature resistance of the fluidization device, especially with respect to the oxygen containing, oxydizing fluidization gas, can become a limiting factor. The oxygen content is therefore preferably adjusted to an oxygen threshold of a maximum of 26% by volume, when the fluidization gas is preheated to a temperature of less than 500° C.

The warming up of the fluidization gas is preferably carried out recuperatively by way of the flue gas. The fluidization gas can thereby be heated energy efficiently to a temperature of up to 500° C. The energy savings are furthermore associated with a reduction in the $CO_2$ emission.

In another, equally preferred process variant, the fluidization gas is preheated to a temperature between 500° C. and 750° C., whereby the oxygen content is adjusted to an oxygen threshold of a maximum of 24% by volume. The heating of the fluidization gas to such high temperatures results in a most complete and quick incineration of the organic waste.

The preheating of the fluidization gas is preferably achieved by combustion with a fuel. A preselected temperature of the fluidization gas can be achieved in a defined and reproducible manner by corresponding control of the combustion process. For example, the fluidization gas is heated to 750° C. by direct over-stoichiometric combustion with a fuel in a pre-combustion chamber. Even higher preheat temperatures are theoretically possible, but are practically limited by the high temperature corrosion resistance of the fluidization device.

The heated fluidization gas can also be diluted with the flue gas produced during the incineration and the oxygen concentration in the fluidization gas thereby adjusted to a preselected value between 10 and 21% by volume.

In the processes described so far, the injection of oxygen into the particle layer is achieved in that oxygen is added to the fluidization gas. However, the oxygen content of the fluidization gas is thereby limited by the resistance of the fluidization device—such as the inflow floor—to a corrosive attack. In an alternative and equally preferred process, the oxygen is injected into the particle layer in a second feed zone above the fluidization device. An oxygen containing gas flow is thereby directly fed into the particle layer. This process is in the following referred to as 'direct feed'. The direct feed can be used alternatively or additionally to the above described processes, to feed the required oxygen to the particle layer. It is a special advantage of the direct feed that the oxygen feed by way of the oxygen containing gas flow is not influenced by the corrosion of the fluidization device and, thus, can be adjusted as high as desired, with the proviso that a mean oxygen content in the open space of 0 to 3% per volume results. The incineration of the organic waste can be further improved thereby.

It has proven especially advantageous to feed the oxygen into the particle layer by transverse supersonic injection. An especially deep penetration of the oxygen into the particle layer is achieved with the supersonic injection and an intimate mixture of the oxygen with the organic waste.

The equivalent oxygen content in the fluidized particle layer above the second feed location is thereby advantageously adjusted to a concentration above 28% per volume. The high oxygen content guarantees an incineration as fast and complete as possible. Equivalent oxygen content means that oxygen content which would occur when the oxygen would be injected directly into the fluidization gas and would accumulate therein.

To achieve the lowest possible $NO_x$ content of the flue gas, it is essential to all the above described processes that a mean oxygen content in the open space in the range of 0 to 3% by volume exists. It has therefore been found advantageous to continuously measure the oxygen content in the open space and to determine a mean oxygen content from the measurements and to control the feed of oxygen into the fluidized particle layer and/or the feed of the organic waste into the incineration chamber on the basis of this mean.

The precision of the oxygen measurement in the open space is improved by determining the mean oxygen content on the basis of measurements at least at two spaced apart measurement locations in the open space. The oxygen content in the region of the measurement locations is measured either directly, or gas is removed thereat from the open space and fed to an oxygen measurement.

A process is preferred wherein at least a part of the fluidization gas is formed by recycled flue gas. This process is distinguished by an especially significant reduction of the $NO_x$ concentration in the flue gas, which can be traced back to the reduction of the molecular nitrogen and the concentration of atomic oxygen in the fluidized particle layer, and to partial CO formation.

A further improvement results with a process wherein uncombusted, solid or gaseous fuels in the flue gas are combusted in a post-incineration combustion zone or post-incineration chamber together with a secondary fuel and with the addition of secondary air, whereby the flue gas is enriched with secondary oxygen or an oxygen containing gas with at least 80% oxygen by volume. This process facilitates compliance with prescribed minimum requirements on the flue gas temperature and the oxygen content in the flue gas. The flue gas is enriched with secondary oxygen or an oxygen containing gas with at least 80% oxygen by volume as required for the maintaining of a preset minimum oxygen content in the flue gas.

Because of the oxygen enrichment of the flue gas, the secondary air can be reduced, without falling below the minimum flue gas temperature. Furthermore, the nitrogen ballast in the secondary air which must also be heated up is reduced, so that the specific fuel requirements can be reduced. The amount of fuel saved thereby corresponds to the amount of heat which would otherwise be necessary to heat the avoided nitrogen ballast to the flue gas temperature.

The effect of the oxygen enrichment of the flue gas is further strengthened when the secondary oxygen or the oxygen containing gas are directly blown into the post-incineration combustion zone or post-incineration chamber at a speed corresponding to an exit Mach number M of 0.25<M<1.

It has proven advantageous to add the secondary oxygen or the oxygen containing gas into the secondary air.

The above mentioned technical task is therefore on the other hand, starting from the initially mentioned process, also achieved in accordance with the invention in that secondary oxygen is fed into the post-incineration reaction zone or post-incineration chamber in such a way that an oxygen content of at least 6% by volume occurs in the flue gas after the post-incineration reaction zone or the post-incineration chamber.

Uncombusted, solid or gaseous fuels in the flue gas are incinerated in the post-incineration combustion zone or post-incineration chamber together with a secondary fuel and with the addition of secondary air, whereby the flue gas is enriched with secondary oxygen or an oxygen containing gas. The oxygen content of such an oxygen containing gas is at least 80% by volume. The minimum requirements on the oxygen concentration in the flue gas can thereby be maintained and this process furthermore facilitates the maintenance of prescribed minimum flue gas temperature requirements. The flue gas is enriched with secondary oxygen or with an oxygen containing gas with at least 80% oxygen by volume as is required for maintaining the preset minimum oxygen content in the flue gas.

Because of the oxygen enrichment of the flue gas, the secondary air can be reduced, without falling below the minimum flue gas temperature. Furthermore, the nitrogen ballast also to be heated up in the secondary air is reduced, so that the specific fuel requirements are reduced.

With respect to the apparatus for execution of the process, the object mentioned above is achieved in accordance with the invention, starting from the device described in the beginning, in that an inlet for an oxygen containing gas flow into the fluidized particle layer is provided and that the measurement device includes at least two measuring points spaced apart in the open space for respectively continuously measuring an oxygen content in the open space, and that the measurement device is connected with a device for the forming of a mean of the measured oxygen contents and with a control for the supply of the organic waste and/or for the supply of the oxygen containing gas flow to the fluidized particle layer.

In the apparatus in accordance with the invention, at least one inlet for an oxygen containing gas stream into the fluidized particle layer is provided. With respect to the effect and function of the oxygen containing gas stream on the throughput and productivity of the incineration, reference is made to the above discussion of the process in accordance with the invention.

The apparatus in accordance with the invention further provides a measurement device with at least two measuring points spaced apart in the open space for respectively continuously measuring an oxygen content in the open space. In the region of the measuring points, the oxygen content is either directly measured or gas is removed from the open space and subsequently analyzed. The precision of the oxygen measurement in the open space is improved by determining the oxygen content as a mean of at least two measurements. Local or temporal variations of the oxygen content are in that way at least partially compensated.

A device—for example a processor—is provided for the calculation of the mean. It is connected with a control for the supply of the organic waste and/or the supply of an oxygen containing gas flow to the fluidized particle layer. The mean of the oxygen content is used as control variable for this control. Since the mean so obtained is distinguished by high stability and precision, a correspondingly exact and stable control of the supply of the organic waste and/or the supply of the oxygen containing gas flow to the fluidized particle layer is achieved. The $NO_x$ content of the flue gas can be further reduced by the stable process control.

The apparatus in accordance with the invention further includes a device by which the nitrogen ballast and thereby the flue gas volume flow upon use of air as oxidation medium for the combustion of uncombusted solid and gaseous flue gas components in a post-incineration combustion zone or in a secondary combustion chamber can be reduced, in that in the region of the post-incineration combustion chamber or in the secondary combustion chamber the required amount of secondary combustion air is replaced by an amount of oxygen corresponding to the prescribed oxygen concentration in the flue gas of, for example, 6% by volume, and the amount of secondary fuel for the heating of the flue gas to the required minimum temperature of, for example, 850° C. is reduced. The amount of saved fuel corresponds at least to the amount of heat which is required to heat the missing nitrogen ballast in the oxidation medium to the flue gas temperature.

The oxygen, in pure form or as an oxygen containing gas, is thereby blown at least at one location with suitable nozzles and at an exit Mach speed "M" of 0.25<M<1 into the post-incineration combustion zone or the secondary combustion chamber, or added into the secondary air flow before entry into the incineration chamber.

Figure 2:
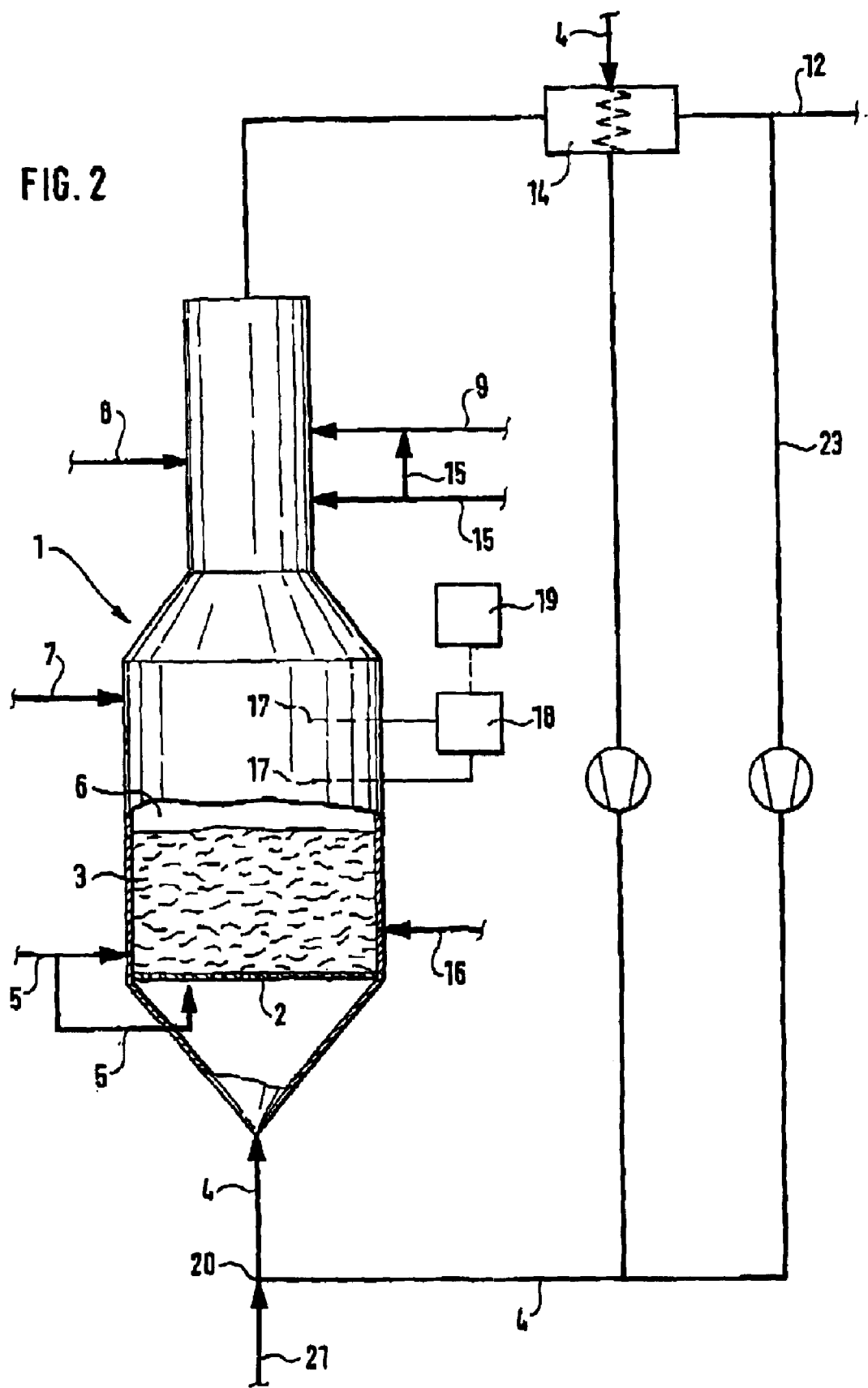
Figure 3:
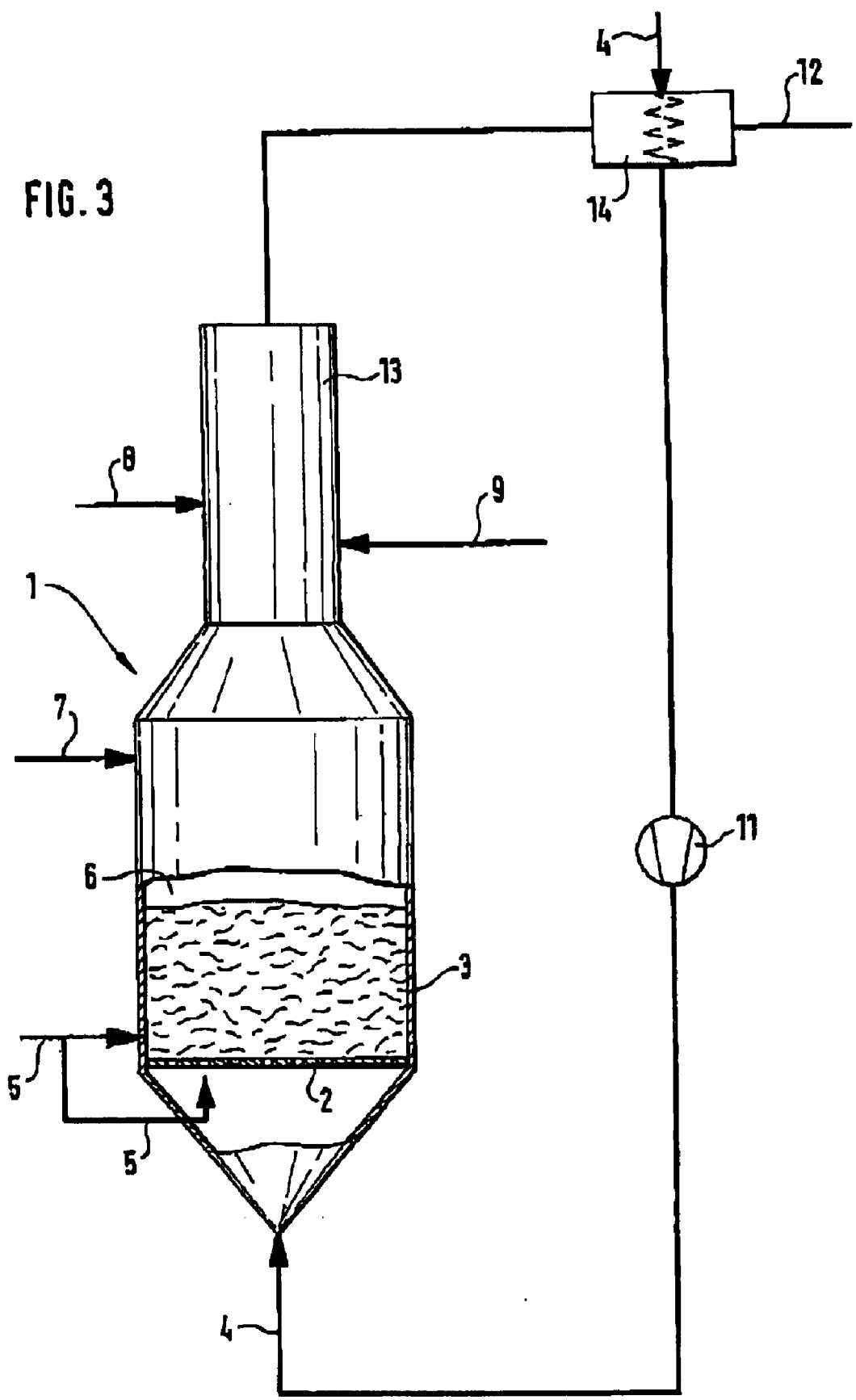

The invention will be further described in the following by way of exemplary embodiments and drawings. The drawings schematically illustrate respectively:

FIG. 1 a stationary fluidized bed furnace according to the invention for the operation of a first process variant of the process in accordance with the invention;

FIG. 2 a stationary fluidized bed furnace according to the invention for the operation of a second process variant of the process in accordance with the invention; and FIG. 3 a stationary fluidized bed furnace according to the prior art.

A fluidized bed furnace 1 known in the art for the incineration of sewage sludge is schematically illustrated in FIG. 3. In the lower portion of the furnace 1, an inflow floor 2 is provided above which a fluidized bed 3 of bed material and sewage sludge is generated in that an air flow 4 produced by a blower 11 is blown from below through the inflow floor 2. The air flow at the same time serves as incineration and fluidization gas. The diameter of the fluidized bed furnace 1 is 5.7 m and the height of the fluidized bed furnace open space is about 10.6 m.

An open space 6 is provided above the fluidized bed 3, through which flue gas 12 is withdrawn. Sewage sludge is continuously fed to the furnace 1 through a feed 7 in the open space 6.

For the heating and incineration of the sewage sludge in the fluidized bed 3, a fuel 5 is admixed with the air flow 4; the fuel 5 can however also be fed directly into the fluidized bed 3.

The flue gas 12 moves from the open space 6 into a post-incineration zone 13 in which uncombusted, solid or gaseous fuel are combusted together with a secondary fuel 8 and the addition of secondary air 9.

The flue gas 12 is withdrawn through a heat exchanger 14 which serves the preheating of the air flow 4.

A sewage sludge incineration process using the furnace 1 schematically illustrated in FIG. 3 is described in the following, whereby the essential process parameters and results are summarized in a table.

COMPARATIVE EXAMPLE 1

| | |
|---|---|
| Sewage sludge throughput | 8500 kg/h |
| Dry matter content | 40% |
| Caloric value | 14,000 kJ/kgGV |
| Fluidized bed temperature | 850° C. |
| Fluidization gas temperature | 702° C. |
| Open space temperature | 920° C. |
| Fluidization gas volume | 14,881 m$^3$/h i.N. |
| Fluidization air volume | 14,275 m$^3$/h i.N. |
| Natural gas volume | 606 m$^3$/h i.N. |
| Flue gas volume in the open space | 22,616 m$^3$/h i.N. |
| Oxygen concentration in the open space | 2% by volume dry |
| Nitrogen concentration in the open space | 49.7% by volume |
| Nitrous oxide concentration in the open space | 180 to 350 mg/m$^3$ |

For the preheating of the fluidization gas to 702° C., 321 m$^3$ of natural gas were over-stoichiometrically combusted with the fluidization air. The oxygen content in the fluidization gas decreased thereby from 21% by volume to about 20.1% by volume.

As far as the reference numerals used in the following fluidized bed furnaces 1 illustrated in FIGS. 1 and 2 are the same as in FIG. 3, the same or equivalent components of the above described fluidized bed furnace 1 are referenced. Reference is made to the corresponding descriptions.

The fluidized bed furnace illustrated in FIG. 1 further includes in the region of the fluidized bed 3 an oxygen feed 16 though which the fluidized bed 3 can be supplied with a first additional oxygen flow 16 (in the form of pure oxygen).

At a feed location 20 below the inflow floor 2, a second additional oxygen flow 21 (also pure oxygen) is admixed with the air flow 4.

Before the feed location 20, an additional fuel 22 is admixed with the air flow 4. The air flow 4 is heated to a temperature of about 702° C. by combustion of the additional fuel 22.

Furthermore, two spaced apart measuring points 17 are provided in the open space 6 for the measurement of the oxygen content in the open space 6. Gas samples are withdrawn by the measuring points 17 and continuously analyzed by way of an oxygen sensor 18. The mean oxygen content in the open space 6 obtained in this way serves the control of the oxygen supply by way of the first additional oxygen flow 16 and/or the second additional oxygen flow 21 and/or the feed 7 for the sewage sludge amount.

Furthermore, either the air flow 9 is enriched with oxygen 15 for the post-incineration of the flue gas 12, or additional oxygen 15 is directly fed into the post-incineration combustion zone.

A comparative example for a process for the sewage sludge incineration using the furnace 1 schematically illustrated in FIG. 1 is described in the following (without control of the oxygen supply):

COMPARATIVE EXAMPLE 2

| | |
|---|---|
| Sewage sludge throughput | 12,750 kg/h |
| Dry matter content | 40% |
| Caloric value | 14,000 kJ/kgGV |
| Fluidized bed temperature | 850° C. |
| Fluidization gas temperature | 702° C. |
| Open space temperature | 920° C. |
| Fluidization gas volume | 14,932 m$^3$/h i.N. |
| Fluidization air volume | 12,344 m$^3$/h i.N. |
| Additional oxygen volume | 1887 m$^3$/h i.N. |
| Natural gas volume | 701 m$^3$/h i.N. |
| Flue gas volume in the open space | 26,522 m$^3$/h i.N. |
| Oxygen concentration in the open space | 5.2% by volume dry |
| Nitrogen concentration in the open space | 37.0% by volume |
| Nitrous oxide concentration in the open space | 310 to 450 mg/m$^3$ |

A comparison of the comparative examples 1 and 2 shows that by addition of oxygen, corresponding to an equivalent oxygen concentration of 30% by volume in the fluidization gas, the throughput could be increased by about 50%. However, it was disadvantageous that the nitrous oxide concentration thereby increased to 310 to 450 mg/m$^3$ and, thus, to above the permissible limit. For compliance with the nitrous oxide limit, an additional measure is therefore necessary, for example the retrofitting with an SCR or SNCR installation. The efficiency of the oxygen process is impeded by the additional investment and capital cost for the reducing agent.

This increase in the nitrous oxide concentration is caused by the nitrous oxide load proportional to the amount of sewage sludge at almost constant flue gas amounts.

The object of the present invention is not only the increase of the throughput of organic waste in fluidized bed reactors without a significant increase in the flue gas volume, but also the reduction of pollutant concentrations, such as, for example, nitrous oxides.

A nitrous oxide reduction process is known from DE 3703568, wherein a mixture of air and flue gases is used as fluidization gas instead of fluidization air, whereby the flue gases are fed to the combustion air in controlled amounts and at a controlled temperature by way of flue gas recirculation after the fluidized bed reactor or the waste heat boiler and the filter.

It has now been surprisingly found that the problem of higher nitrous oxide concentration at constant flue gas volumes and simultaneously increased sewage sludge throughput with added oxygen can be solved in that the oxygen concentration in the fluidized bed 3 is enriched according to the higher sewage sludge amount and a part of the air flow 4 is replaced by recirculated flue gas 23 withdrawn after the heat exchanger 14, so that a mean oxygen content of 0 to 3% $O_2$ by volume occurs in the open space 6 above the fluidized bed 3.

Such an exemplary embodiment for a process in accordance with the invention using the furnace 1 schematically illustrated in FIG. 1 is described in the following, whereby the essential process parameters and results are again summarized in a table. The nominal value of the oxygen content is hereby 1.3% by volume.

EXAMPLE 1

| | |
|---|---|
| Sewage sludge throughput | 12,750 kg/h |
| Dry matter content | 40% |
| Caloric value | 14,000 kJ/kgGV |
| Fluidized bed temperature | 850° C. |
| Fluidization gas temperature | 702° C. |
| Open space temperature | 920° C. |
| Fluidization gas volume | 15,191 m³/h i.N. |
| Fluidization air volume | 6,844 m³/h i.N. |
| Return gas volume | 5,500 m³/h i.N. |
| Additional oxygen volume | 2203 m³/h i.N. |
| Natural gas volume | 644 m³/h i.N. |
| Flue gas volume in the open space | 26,695 m³/h i.N. |
| Oxygen concentration in the open space | 1.3% by volume |
| Nitrogen concentration in the open space | 28.6% by volume |
| Nitrous oxide concentration in the open space | 60 to 180 mg/m³ |

The additional oxygen flow 21 is mixed with the air flow 4 before the inflow floor 2. In case the air flow is not preheated, an oxygen concentration of 28% by volume is maintained for safety reasons after the feed location 20. When the air flow 4 is preheated to up to 500° C., the safety relevant limit for the oxygen concentration in the $O_2$-enriched air flow 4 after the feed location 20 must be reduced to 20 to 26% by volume. This limit is reduced to 24% by volume when the $O_2$-enriched air flow 4 is heated to a temperature between 500° C. and 750° C.

No amount limitations or $NO_x$ concentration limitations are present when the oxygen is directly blown as additional oxygen flow 16 into the fluidized bed 4 by high speed nozzles with exit Mach numbers of at least Mach 0.8, preferably higher than Mach 1. The high speeds are necessary for a sufficient mixing of the oxygen with the fluidized bed 3, in order to achieve, upon an increase in the sewage sludge throughput and constant flue gas amounts, which means fluidization speeds, an even mixing of the sewage sludge with the oxygen, which means a homogeneous temperature in the fluidized bed 4.

A further exemplary embodiment of a fluidized bed furnace 1 according to the invention is illustrated in FIG. 2.

In contrast to the embodiment shown in FIG. 1, the air flow 4 in this fluidized bed furnace 1 can be recuperatively preheated in the heat exchanger 14 by the flue gas 12 and at the same time flue gas 12 can be admixed to the air flow 4.

What is claimed is:

1. Process for the incineration of organic waste, in which the waste material in an incineration chamber is flown through from below by an oxygen containing fluidization gas by way of a fluidization device, whereby a fluidized particle layer is formed and the waste material is incinerated, and flue gas generated is withdrawn by way of an open space above the particle layer and combusted in a post-incineration reaction zone or post-incineration combustion chamber, characterized in that the fluidized particle layer is enriched with pure oxygen or a gas mixture with an oxygen content of at least 80% by volume, whereby a mean oxygen content in the range of 0 to 3% by volume occurs in the open space above the particle layer.

2. Process according to claim 1, characterized in that oxygen is fed into the fluidization gas in a first feed zone in flow direction ahead of the fluidization device.

3. Process according to claim 2, characterized in that the oxygen content of the fluidization gas after the first feed zone is adjusted to an oxygen limit in the range of 10% by volume to 28% by volume.

4. Process according to claim 3, characterized in that the oxygen content is adjusted to an oxygen limit of maximally 26% by volume, with the proviso that the fluidization gas is preheated to a temperature of less than 500° C.

5. Process according to claim 4, characterized in that the fluidization gas is recuperatively preheated by way of the flue gas.

6. Process according to claim 3, characterized in that the oxygen content is adjusted to an oxygen limit of maximally 24% by volume, with the proviso that the fluidization gas is preheated to a temperature between 500° C. and 750° C.

7. Process according to claim 6, characterized in that the fluidization gas is preheated by combustion with a fuel.

8. Process according to claim 1, characterized in that oxygen is fed to the fluidized particle layer in a second feed zone above the fluidization device.

9. Process according to claim 8, characterized in that the oxygen in the second feed zone is added by transversal supersonic injection into the particle layer.

10. Process according to claim 8, characterized in that the equivalent oxygen content in the fluidized particle layer above the second feed location is adjusted to a concentration larger than 28% by volume.

11. Process according to claim 1, characterized in that the oxygen content in the open space is continuously measured and a mean determined from the measurements, and that the feed of oxygen into the fluidized particle layer and/or the feed or the organic waste into the incineration chamber are controlled by way of the mean.

12. Process according to claim 11, characterized in that the mean oxygen content is determined on the basis of measurements at least at two spaced apart measurement points in the open space.

13. Process according to claim 1, characterized in that at least a part of the fluidization gas is formed by recirculated flue gas.

14. Process according to claim 1, characterized in that fuels selected from the group consisting of uncombusted, solid and gaseous fuels in the flue gas are combusted in a post-incineration combustion zone or a post-incineration combustion chamber together with a secondary fuel with added secondary air, whereby for the maintaining of a preset minimum oxygen content in the flue gas the flue gas is enriched with secondary oxygen or with an oxygen containing gas with at least 80% by volume oxygen.

15. Process according to claim 14, characterized in that the secondary oxygen or the oxygen containing gas are blown directly into the post-incineration combustion zone or the post-incineration combustion chamber at a speed corresponding to an exit Mach speed M of 0.25<M<1.

16. Process according to claim 14, characterized in that the secondary oxygen or the oxygen containing gas are added to the secondary air.

17. Process for the incineration of organic waste, in which the waste material in an incineration chamber is flown through from below by an oxygen containing fluidization gas by way of a fluidization device, whereby a fluidized particle layer is formed and the waste material is incinerated, and flue gas generated is withdrawn by way of an open space above the particle layer and combusted in a in a post-incineration reaction zone or post-incineration combustion chamber, characterized in that the fluidized particle layer is enriched with pure oxygen or a gas mixture with an oxygen content of at least 80% by volume, and in that secondary oxygen is fed into the post-incineration combustion zone or post-incineration combustion chamber in such a way that an oxygen content of at least 6% by volume occurs in the flue gas behind the post-incineration combustion zone or post-incineration combustion chamber.

18. Apparatus for the operation of a process for the incineration of organic waste comprising an incineration chamber for receiving an organic waste with a feed device for the supplying of the organic waste to the incineration chamber, with a gas inlet, comprising a fluidization device for the feeding of a fluidization gas fo the generation of a fluidized particle layer, and with a measurement device for the measurement of a gas concentration in an open space above the particle layer, characterized in that an inlet for an oxygen containing gas flow into the fluidized particle layer is provided, and that the measurement device includes at least two oxygen measurement points positioned spaced apart in the open space for the continuous measuring of respectively one oxygen content in the open space, and that the measurement device is connected with a device for the formation of a mean from the measured oxygen contents and with a control for the feed of the organic waste and/or the feed of the oxygen containing gas flow to the fluidized particle layer.

* * * * *